Figure 1:
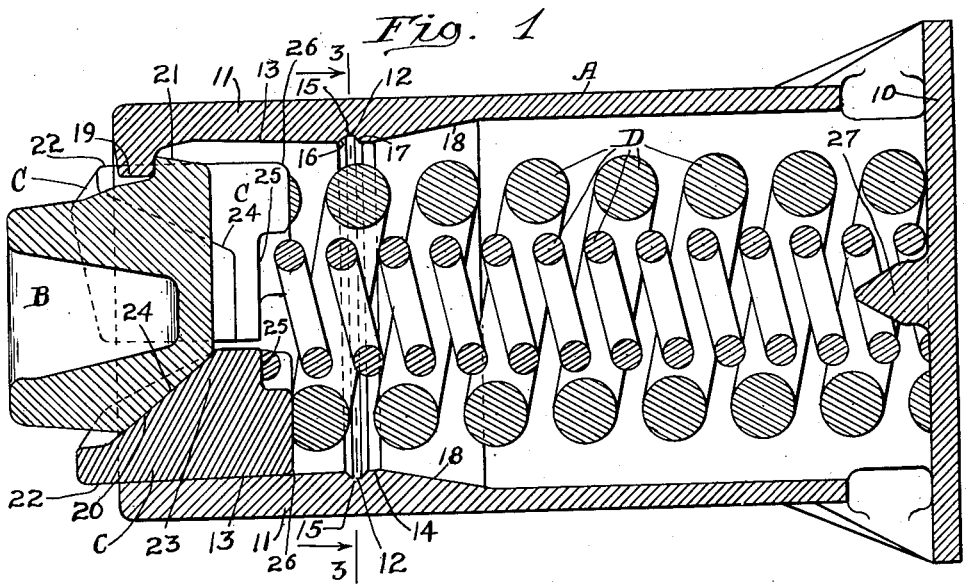

Nov. 29, 1949 — G. E. DATH — 2,489,403
FRICTION SHOCK ABSORBING MECHANISM FOR RAILWAY DRAFT RIGGINGS
Filed Dec. 15, 1947 — 2 Sheets-Sheet 1

Inventor:
George E. Dath.
By Henry Fuchs.
Atty

Nov. 29, 1949  G. E. DATH  2,489,403
FRICTION SHOCK ABSORBING MECHANISM
FOR RAILWAY DRAFT RIGGINGS
Filed Dec. 15, 1947  2 Sheets-Sheet 2
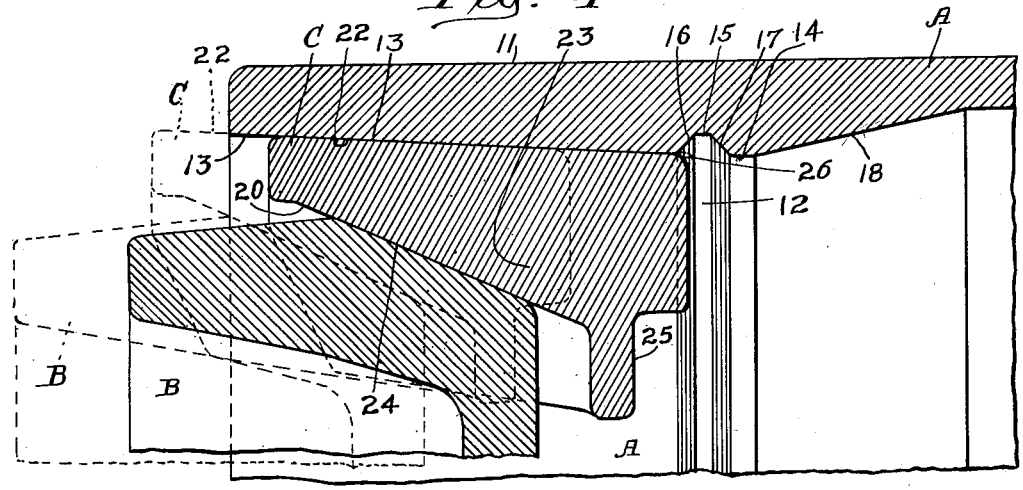
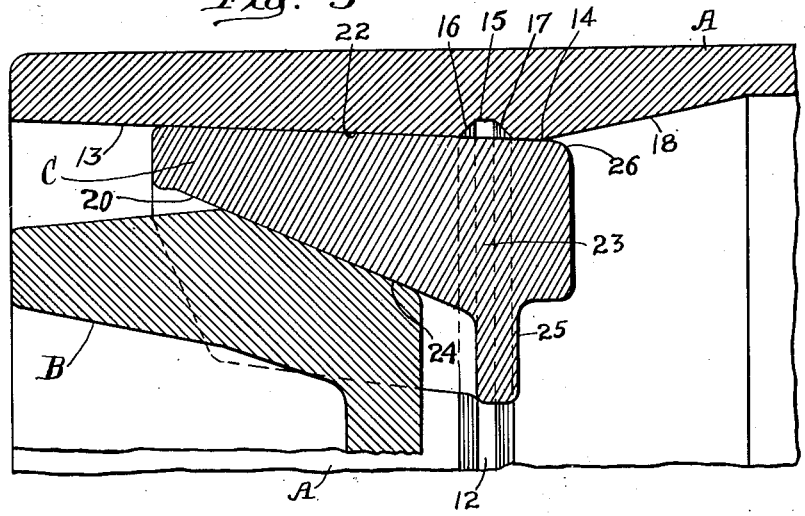
Inventor:
George E. Dath.
By Henry Fuchs.
Atty.

Patented Nov. 29, 1949

2,489,403

UNITED STATES PATENT OFFICE 2,489,403

FRICTION SHOCK ABSORBING MECHANISM FOR RAILWAY DRAFT RIGGINGS

George E. Dath, Mokena, Ill., assignor to W. H. Miner, Inc., Chicago, Ill., a corporation of Delaware Application December 15, 1947, Serial No. 791,784

3 Claims. (Cl. 213—34)

1

This invention relates to improvements in friction shock absorbing mechanisms, especially adapted for railway draft riggings. More particularly, the invention relates to such mechanisms wherein are employed spring resisted friction shoes and a cooperating friction column element with which the shoes have lengthwise sliding engagement and against which they are pressed by wedge acting means.

In mechanisms of this character, especially as applied to draft riggings of railway cars, the travel of the friction elements with respect to each other is variable in actual service, the same being relatively shorter to take care of the great number of normal shocks encountered in service than in taking care of the less occasional, abnormally heavy shocks in which the maximum limit of travel is reached, with the result that the friction surfaces are subjected to uneven wear lengthwise of the mechanism, the zone of the normal shorter travel showing the greatest wear, and the metal of the friction surfaces being built up into a ridge or shoulder at the end of the path of said normal travel. Elevations or ridges are thus formed on the friction surfaces, which interfere with the proper functioning of the mechanism, there being imminent danger of sticking as the shoes encounter these obstructions when the mechanism is subjected to the occasional and abnormal, relatively heavy closing shocks.

The main object of the invention is to provide a very simple expedient for overcoming the defects hereinbefore set forth by dividing the area of friction of the column element of the friction shock absorbing mechanism into separate and distinct, front and rear, or outer and inner, friction surfaces separated by a transverse groove or depression, and proportioning the parts of the mechanism so that the shoes traverse the length of the front or outer friction surfaces only in absorbing the normal shocks and wipe the scrapings into the groove, and traverse the entire combined length of the front and rear, or inner and outer friction surfaces in the maximum travel thereof in absorbing the heavy abnormal shocks.

A further object of the invention is to provide a friction shock absorbing mechanism including a column element and a spring resisted friction shoe, pressed against the column and movable lengthwise thereon to absorb the shocks, wherein the column element is provided with successively acting, front and rear friction surfaces, separated by a transverse depression or groove, the parts

2 being so proportioned that during operation of the mechanism, in absorbing the usual normal shocks, the shoe travels the length of the front surface only, and at full compression of the mechanism travels beyond the front surface and to the rear end of the rear surface, said rear surface bracing the shoe against tilting at maximum compression or closing action of the mechanism.

A still further object of the invention is to provide a mechanism as set forth in the preceding paragraph, wherein the walls of the transverse depression or groove present inclined cam faces, which act to guide the shoe as it moves from one friction surface to the other, thereby preventing shouldering of the shoe when disalignment of the surfaces occurs, due to uneven wear thereof.

Other objects of the invention will more clearly appear from the description and claims hereinafter following.

Figure 2:
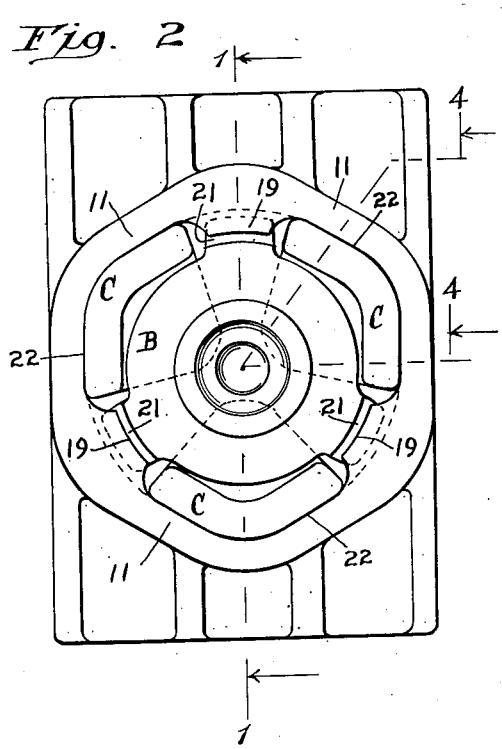
Figure 3:
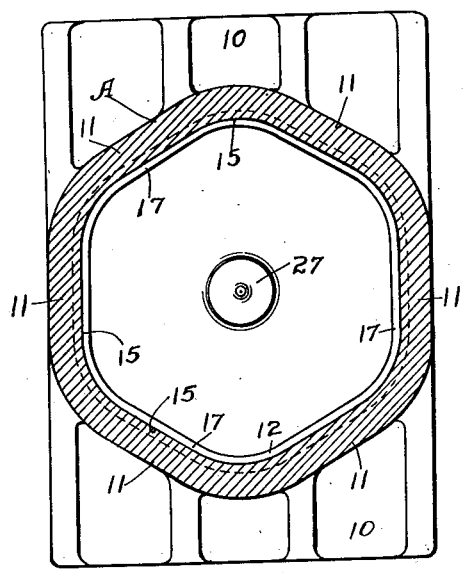

In the accompanying drawings forming a part of this specification, Figure 1 is a longitudinal, transverse sectional view of my improved friction shock absorbing mechanism, corresponding substantially to the line 1—1 of Figure 2. Figure 2 is a front end elevational view of Figure 1. Figure 3 is a transverse sectional view, corresponding substantially to the line 3—3 of Figure 1. Figure 4 is a broken sectional view, on an enlarged scale, corresponding substantially to the line 4—4 of Figure 2, showing in dotted lines the positions assumed by the wedge and shoes in full release of the mechanism, and showing in full lines the positions assumed by the wedge and shoes when the mechanism has been compressed to its normal extent in service. Figure 5 is a view similar to Figure 4, showing the mechanism fully compressed or closed.

As shown in the drawings, my improved friction shock absorbing mechanism comprises broadly a friction casing A, a wedge block B, three friction shoes C—C—C, and a spring resistance D.

The casing A is in the form of a hollow tubular member, open at its front end and closed at its rear end by a transverse wall 10, which is extended laterally outwardly beyond the sides of the casing to provide a rear follower member, which is integral with the casing and cooperates with the usual rear stop lugs of the center sills of a railway car. The casing is of hexagonal, interior and exterior, transverse cross section, and the walls thereof are thickened at its open end. This thickened wall portion of the casing provides the friction shell proper 11 of the same, presenting inwardly converging frictional areas of V-shaped, transverse cross section, each V-shaped frictional area being formed by the interior faces of two adjacent walls of the hexagonal casing. Each V-shaped friction area is provided with a transverse groove 12 near the rear end of the same, thus dividing the frictional area into front and rear, or outer and inner, longitudinally aligned friction surfaces 13 and 14 of V-shaped transverse section. The groove 12 is continuous around the interior of the casing and lies in a plane at right angles to the central longitudinal axis of the casing. The groove 12 is in the form of a relatively wide trough of substantially V-shaped transverse section, having a flat bottom or inner wall 15 and inclined front and rear walls 16 and 17, which diverge outwardly of the groove. The walls 16 and 17 are preferably inclined at an angle of 45 degrees to the vertical. As shown, the front or outer friction surfaces 13 are relatively long while the rear or inner friction surfaces 14 are very much shorter. The inclined walls 16 and 17 of the groove 12 provide cam faces merging with the corresponding ends of the friction surfaces 13 and 14 for guiding the shoes as they move from one friction surface to the other when the surfaces become disaligned, due to uneven wear of the surfaces with respect to each other. At the extreme inner or rear end of the rear friction surface 14, the casing wall is cut away, as shown, on an inclination, thereby providing a depression 18 at the end of said surface, which the shoe slightly overrides in maximum compression of the mechanism, as shown in Figure 5. The length of the front or outer friction surface is such that the friction shoe traverses substantially the entire length of the same and slightly overrides the front edge of the groove 12 during compression of the mechanism in absorbing the normal shocks to which the mechanism is subjected in normal service. The groove 12 is sufficiently wide to permit variations in length of travel of the shoes to the extent of the width of the groove to take care of variations in travel due to variations in intensity of the normal shocks encountered.

At the open outer end, the casing A is provided with three inturned stop lugs 19—19—19, which are alternated with the V-shaped friction surfaces of the casing, the same being at the corners of the casing between adjacent of said V-shaped surfaces.

The wedge B is in the form of a block having a set of three wedge faces 20—20—20 at its inner end, which are arranged symmetrically about the central longitudinal axis of the mechanism and converge inwardly thereof. Each wedge face 20 is of V-shaped transverse cross section. At its inner end, the wedge B also has three laterally outwardly projecting radial lugs 21—21—21, which are alternated with the wedge faces 20—20—20. In other words, the lugs 21—21—21 are arranged so that they are located between adjacent wedge faces and extend between adjacent shoes C—C to engage in back of the lugs 19—19—19 of the casing to restrict outward movement of the wedge B and hold the parts of the mechanism assembled. The front end of the wedge B receives the actuating force, bearing on the usual front follower, not shown, of the draft rigging of the railway car.

The three friction shoes C—C—C surround the wedge B, being interposed between the wedge faces 20 of the latter and the friction surfaces of the casing. The three shoes are of similar design, each having an outer longitudinally extending, V-shaped friction surface 22, similarly inclined to and normally engaged with one of the friction surfaces 13 of the casing. On the inner side, each shoe is provided with an enlargement 23 having a wedge face 24 of V-shaped, transverse section, engaging the corresponding V-shaped wedge face 20 of the wedge B and correspondingly inclined thereto. The inner ends of the enlargements 23 of the shoes present flat transverse abutment faces 25 on which the inner coil of the spring resistance D bears.

As shown in Figures 1, 4, and 5, the corner at the rear end of each shoe at the friction surface side thereof is rounded off, as indicated at 26, to cooperate with the inclined wall 17 of the groove 12 to guide the shoe in its movement from the front friction surface 13 onto the rear friction surface 14 when these surfaces become disaligned, due to greater wear of the friction surface 13 than of the surface 14.

The spring resistance D, which is interposed between the shoes C—C—C and the rear end wall 10 of the casing, comprises an inner light coil and a heavier outer coil. The outer coil bears at its front end directly on the flat rear ends of the shoes and the inner coil has its front end seated on the abutment faces 25 at the rear ends of the enlargements 23 of said shoes. The rear ends of both coils of the spring resistance D bear on the end wall 10 of the casing, the inner coil being centered by a boss 27 extending into the same and projecting from said rear wall.

The operation of my improved friction shock absorbing mechanism, upon inward movement of the wedge B with respect to the casing A being produced, due to compression of the mechanism, is as follows: The spring resisted friction shoes are wedged apart and carried inwardly of the mechanism, compressing the spring resistance D, thus producing frictional resistance between the friction surfaces of the shoes and casing. During the numerous shocks which are normally encountered in service, the shoes C—C—C travel inwardly of the casing, substantially the full length of the outer or front friction surfaces 13, as shown in full lines in Figure 4, while during the relatively rarely occurring heavier or abnormal closing shocks, they travel beyond the surfaces 13 onto the inner or rear surfaces 14 and beyond the same, as shown in Figure 5, in which figure the mechanism is illustrated as fully compressed, the wedge B having been forced inwardly to its full extent with its outer end flush with the outer end of the casing so that the usual front follower of the draft rigging engages the outer end of the casing and the pressure is transmitted directly through the casing and follower, which act as a solid column to prevent undue compression of the operative parts, including the wedge B, the shoes C—C—C, and the spring resistance D. The front or outer friction surface 13 of each set of surfaces 13 and 14 of the casing, which may be termed the normally operative surface, obviously receives the greatest wear and, when it becomes disaligned with respect to the rear or inner surface due to such wear, the inclined rear wall 17 of the groove 12 acts to guide the shoe from the surface 13 onto the surface 14 without danger of sticking. As wear occurs on the friction surface 13, the metal scrapings produced by compression will be wiped clear into the groove 12, and as wear occurs on the surface 14 the scrapings will be wiped clear into the depression 18 at the rear end of this surface. In this connection it is pointed out that the relatively short rear or inner friction surfaces 14 effectively prevent failure of the mechanism to operate properly, due to canting of the shoes when the same travel rearwardly beyond the end of the normally acting friction surfaces 13, by the rear ends of the shoes being braced against spreading, which canting might otherwise occur when they pass rearwardly beyond the friction surfaces 13 to the extent shown in Figure 5 upon the mechanism being fully compressed or closed.

Upon the actuating force being reduced, the parts of the mechanism are returned to their normal full release position, as shown in Figure 1, by the expansive action of the spring D, the wedge B being limited in its outward movement by engagement of the lugs thereof with the lugs of the casing A.

As will be evident, my improved arrangement of transversely grooving the frictional area of the friction casing to provide relatively long, normally acting outer friction surfaces and short inner friction surfaces successfully overcomes the forming of ridges on the surfaces of the frictional area, which would interfere with the proper operation of the mechanism, due to danger of sticking of the shoes, the entire length of the outer or front friction surfaces being traversed by the shoes under the usual normal service conditions, with the exception of the very short travel of the shoes produced by immaterial light oscillating shocks imparted to the shock absorbing mechanism during continuous motion of the train of cars while traveling, the very slight wear produced by such light shocks being so slight as to be of negligible quantity in the formation of ridges on the friction areas, any such slight ridges which may be formed in advance of the transverse groove 12 being taken care of by the frequent wiping action of the shoes in traveling the full length of the normally acting friction surfaces 13.

I claim:

1. In a friction shock absorbing mechanism, the combination with a friction element having a front friction surface of predetermined length; of a depression at the inner end of said surface, said surface being continuous from the front end of the casing to said groove; a friction shoe slidable on said friction surface, said shoe being moved substantially the entire length of said friction surface while the mechanism is subjected to normal shocks encountered in service, and being rearwardly movable beyond said friction surface under abnormal shocks; a friction surface rearwardly of said depression on which said shoe is supported when moved beyond said first named surface and over said depression; a second depression at the rear end of said second named surface, said second named surface being continuous between said depressions, and said shoe being of a length to project rearwardly beyond the end of said second named friction surface when the mechanism is fully compressed; spring means yieldingly opposing inward movement of the shoe; and an inwardly movable wedge having wedging engagement with said shoe.

2. In a friction shock absorbing mechanism, the combination with a friction casing having front and rear, longitudinally aligned, interior friction surfaces separated by a transverse depression, said casing presenting a depressed wall at the rear end of each rear friction surface, each of said front friction surfaces being continuous between the front end of said casing and the depression between said surfaces, and each of said rear surfaces being continuous between said depression and depressed wall; of a central wedge block movable inwardly of the casing; friction shoes surrounding said wedge block and having wedging engagement therewith, said shoes having sliding frictional engagement with said front and rear friction surfaces successively and overriding said depressed wall portions in full compression of the mechanism; and spring means within the casing yieldingly opposing inward movement of the shoes.

3. In a friction shock absorbing mechanism, the combination with a friction casing having lengthwise extending sets of front and rear friction surfaces, said surfaces of each set being separated by a transverse depression, each of said front surfaces being continuous from the front end of the casing to said depression, and the wall of said casing being depressed at the rear end of each of said rear surfaces; of a central wedge movable inwardly of the casing; a plurality of friction shoes surrounding said wedge and in wedging engagement therewith; a lengthwise extending friction surface on each shoe successively engageable with said front and rear surfaces of the corresponding set during full compression of the mechanism, said shoes being of a length to override said rear friction surfaces when the mechanism is fully compressed; and spring means yieldingly resisting inward movement of said shoes.

GEORGE E. DATH.

REFERENCES CITED

The following references are of record in the file of this patent:

UNITED STATES PATENTS

| Number | Name | Date |
| --- | --- | --- |
| 1,009,696 | Simpson | Nov. 21, 1911 |
| 1,585,679 | O'Connor | May 25, 1926 |
| 2,280,428 | Cottrell | Apr. 21, 1942 |